(12) United States Patent
Kabetani et al.

(10) Patent No.: US 12,098,912 B2
(45) Date of Patent: Sep. 24, 2024

(54) SHEET PRODUCING DEVICE AND SHEET PRODUCING METHOD

(71) Applicant: Panasonic Intellectual Property Management Co., Ltd., Osaka (JP)

(72) Inventors: Yasuhiro Kabetani, Osaka (JP); Koya Homma, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 231 days.

(21) Appl. No.: 17/314,085

(22) Filed: May 7, 2021

(65) Prior Publication Data
US 2021/0372774 A1  Dec. 2, 2021

(30) Foreign Application Priority Data

May 26, 2020  (JP) ................................. 2020-091314

(51) Int. Cl.
*G01B 11/06* (2006.01)
*B05C 1/08* (2006.01)
(Continued)

(52) U.S. Cl.
CPC ............ *G01B 11/0675* (2013.01); *B05C 1/08* (2013.01); *B05C 11/00* (2013.01); *B65H 18/16* (2013.01); *G01B 11/06* (2013.01)

(58) Field of Classification Search
CPC . G01B 11/0675; G01B 11/0691; G01B 11/06; G01B 9/02004; G01B 9/02091;
(Continued)

(56) References Cited

U.S. PATENT DOCUMENTS 8,582,088 B2 * 11/2013 Bain ......................... G07D 7/12
356/71
9,404,733 B2 * 8/2016 Kabetani ............ G01B 9/02004
(Continued)

FOREIGN PATENT DOCUMENTS

JP          5-185022          7/1993
JP          9-145327          6/1997
(Continued)

*Primary Examiner* — Violeta A Prieto
(74) *Attorney, Agent, or Firm* — Wenderoth, Lind & Ponack, L.L.P.

(57) ABSTRACT

The present disclosure is a sheet producing device for producing a multi-layer sheet by applying a coating material to a sheet material. The sheet producing device includes a radiation light source that emits radiation light, a division part that divides the radiation light into measurement light to be incident on the multi-layer sheet and reference light with which a reference surface is to be irradiated, and an optical member that emits the measurement light onto the multi-layer sheet and receives the measurement light reflected by the multi-layer sheet. An interference detector that detects interference light between the measurement light reflected by the multi-layer sheet and the reference light reflected by the reference surface, and a thickness calculator that calculates a thickness of the sheet material and a thickness of the coating material of the multi-layer sheet based on the detected interference light are further included. As a result, the tact time from the production of the multi-layer sheet to the calculation of the thickness can be shortened.

9 Claims, 10 Drawing Sheets

(51) Int. Cl.
   *B05C 11/00* (2006.01)
   *B65H 18/16* (2006.01)
(58) Field of Classification Search
   CPC ........... B05C 1/08; B05C 11/00; B05C 1/083;
                  B05C 11/1005; B65H 18/16; B65H
                  18/103; B65H 2301/5114; B65H 2511/13;
                  B65H 2553/414
   See application file for complete search history.

(56) References Cited

U.S. PATENT DOCUMENTS

| | | | | |
|---|---|---|---|---|
| 9,859,584 B2* | 1/2018 | Kabetani | ................ | B65H 81/00 |
| 2012/0307257 A1* | 12/2012 | Yoshii | ................ | G01N 21/4795 |
| | | | | 359/290 |
| 2013/0027714 A1* | 1/2013 | Yoshii | ................ | G01B 9/02091 |
| | | | | 359/344 |
| 2013/0114086 A1* | 5/2013 | Yamada | ................ | H01S 5/141 |
| | | | | 372/20 |
| 2015/0323309 A1* | 11/2015 | Kabetani | ................ | H01G 4/005 |
| | | | | 356/508 |
| 2015/0380890 A1* | 12/2015 | Inoue | ................ | H01S 3/1109 |
| | | | | 372/26 |
| 2016/0308240 A1* | 10/2016 | Kabetani | ............ | G01B 9/02091 |

FOREIGN PATENT DOCUMENTS

| | | | |
|---|---|---|---|
| JP | 2000-177263 | | 6/2000 |
| JP | 2000177263 A | * | 6/2000 |
| JP | 2002-243415 | | 8/2002 |
| JP | 2004-361382 | | 12/2004 |
| JP | 2006-349530 | | 12/2006 |
| JP | 2015-148488 | | 8/2015 |

* cited by examiner

SHEET PRODUCING DEVICE AND SHEET PRODUCING METHOD

BACKGROUND

1. Technical Field

The present disclosure relates to a sheet producing device and a sheet producing method.

2. Description of the Related Art

For a band-shaped laminated sheet constituted by a plurality of layers, it is important to inspect the thickness of the laminated sheet due to its characteristics. As a device for inspecting the thickness of the laminated sheet, a device as illustrated in FIG. 10 is disclosed, for example, in Japanese Patent Unexamined Publication No. H5-185022 (hereinafter referred to as "Patent Literature 1").

The device for inspecting the thickness of the laminated sheet described in Patent Literature 1 includes knife 92 that is provided more transporting destination side of metal plate 91 than a coating position of resin 90 and controls the thickness of coated resin 90. The device includes X-ray thickness meter 93 provided more transporting destination side of metal plate 91 than the coating position of resin 90. First, the device in Patent Literature 1 measures the thickness of metal plate 91 by using X-ray thickness meter 93. Arithmetic operation device 94 advances and retreats knife 92 with respect to metal plate 91 according to the deviation of the measured thickness of metal plate 91. As a result, the non-uniformity of the thickness of the film of resin 90 applied to metal plate 91 is reduced.

However, in the technique of Patent Literature 1, the thickness of the laminated sheet after applying resin 90 is not inspected. Therefore, there is a possibility that a laminated sheet having a desired thickness cannot be manufactured. Therefore, a configuration is conceivable in which X-ray thickness meter 93 is provided more transporting destination side of metal plate 91 than the coating position of resin 90, and the thickness of the laminated sheet is inspected by using X-ray thickness meter 93. However, in such a configuration, it is necessary to interpose the laminated sheet from the front and back by an X-ray irradiator and a detector of X-ray thickness meter 93. The above device also requires a cover or the like to prevent an explosion. Therefore, an installation place of X-ray thickness meter 93 is limited. That is, a coating position and an inspection position of the resin are physically separated. As a result, there is a possibility that the tact time from the application of the resin to the acquisition of the thickness of the laminated sheet is long.

SUMMARY

The present disclosure provides a sheet producing device and a sheet producing method capable of shortening the tact time from the start of producing a multi-layer sheet to the end of calculating the thickness.

A sheet producing device of the present disclosure is a sheet producing device for producing a multi-layer sheet by applying a coating material to a sheet material that is transported. The sheet producing device includes a radiation light source that emits radiation light, a division part that divides the radiation light into measurement light to be incident on the multi-layer sheet and reference light with which a reference surface is to be irradiated, and an optical member that emits the measurement light onto the multi-layer sheet and receives the measurement light reflected by the multi-layer sheet. The sheet producing device further includes an interference detector that detects interference light in which the measurement light reflected by the multi-layer sheet and the reference light reflected by the reference surface interfere with each other, and a thickness calculator that calculates a thickness of the sheet material and a thickness of the coating material of the multi-layer sheet based on the detected interference light.

A sheet producing method of the present disclosure is a sheet producing method for producing a multi-layer sheet by applying a coating material to a sheet material that is transported. The sheet producing method includes a step of emitting radiation light from a radiation light source, a step of dividing the radiation light into measurement light and reference light, and a step of causing an optical member to emit the measurement light onto the multi-layer sheet and making the measurement light reflected by the multi-layer sheet incident on the optical member. The sheet producing method further includes a step of irradiating a reference surface with the reference light, a step of detecting interference light in which the measurement light reflected by the multi-layer sheet and the reference light reflected by the reference surface interfere with each other, and a step of calculating a thickness of the sheet material and a thickness of the coating material of the multi-layer sheet based on the detected interference light.

According to the present disclosure, it is possible to provide a sheet producing device and a sheet producing method capable of shortening the tact time from the start of producing a multi-layer sheet to the end of calculating the thickness of the multi-layer sheet.

DETAILED DESCRIPTION

Each exemplary embodiment of the present disclosure will be described with reference to the drawings.

Exemplary Embodiment 1

Hereinafter, a sheet producing device according to Exemplary Embodiment 1 of the present disclosure will be described separately in terms of items.

Schematic Configuration of Sheet Producing Device

First, a schematic configuration of sheet producing device 1 according to Exemplary Embodiment 1 of the present disclosure will be described with reference to FIG. 1.

Figure 1:
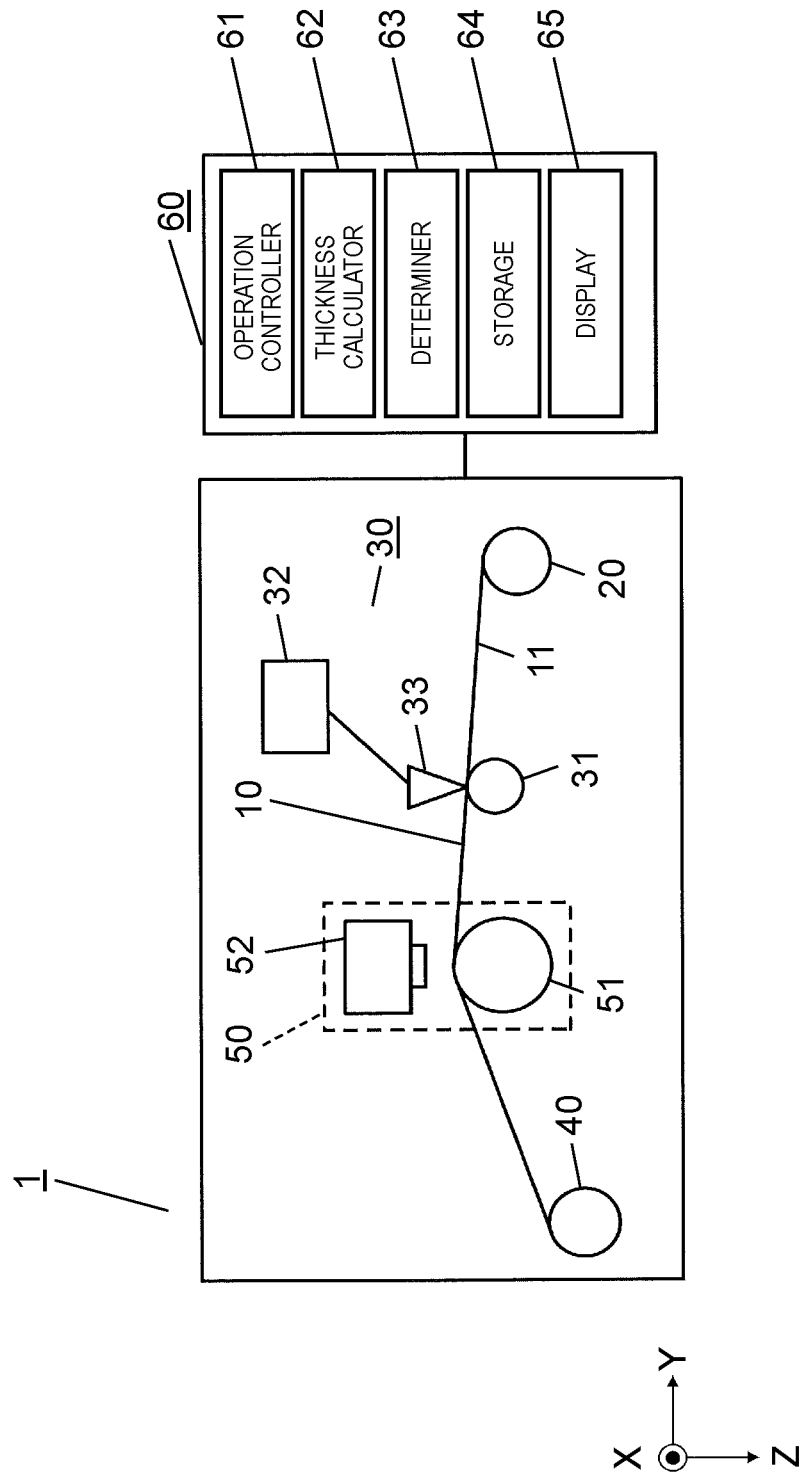
FIG. 1 is a schematic view illustrating a schematic configuration of a sheet producing device according to Exemplary Embodiment 1 of the present disclosure.

FIG. 1 is a schematic view of sheet producing device 1 according to Exemplary Embodiment 1 of the present disclosure. In the following, a direction may be described with reference to the XYZ axes illustrated in FIG. 1. Specifically, the Y-axis corresponds to a length direction or a transporting direction of sheet material 11 or multi-layer sheet 10. The X-axis corresponds to a width direction of sheet material 11 or multi-layer sheet 10 or a direction orthogonal to the transporting direction.

Sheet producing device 1 is a device that produces multi-layer sheet 10 in which coating material 12 (see FIG. 6A) is applied to sheet material 11 and performs inspection of multi-layer sheet 10.

Specifically, as illustrated in FIG. 1, sheet producing device 1 of Exemplary Embodiment 1 includes sheet supply reel 20, coater 30, winding roll 40, SS-OCT device 50, sheet generation controller 60, and the like. The SS-OCT is an abbreviation for swept-source optical coherence tomography.

Sheet supply reel 20 is provided such that the rotation axis is parallel to the X-axis. Sheet material 11 wound in a roll shape is installed on sheet supply reel 20. Sheet supply reel 20 supplies sheet material 11 to coater 30. Sheet material 11 is a base material of multi-layer sheet 10, for example, a resin sheet such as cellophane resin or polyimide resin, or cotton, resin fibers, fabric woven with fiberglass, or non-woven fabric.

Coater 30 includes coating roll 31, coating supply device 32, coating device 33, and the like.

Coating roll 31 is provided such that the rotation axis is parallel to the X-axis, at a position more transporting direction side (on the side in the −Y direction) of sheet material 11 than sheet supply reel 20.

Coating supply device 32 supplies coating material 12 to coating device 33. Coating material 12 is, for example, an adhesive made of a resin such as epoxy or acrylic, or a filler applied for the purpose of reinforcing mechanical intensity against fibers and improving weather resistance.

Coating device 33 is provided an upper side of coating roll 31 (on the side in the −Z direction). Coating device 33 applies coating material 12 supplied from coating supply device 32 to sheet material 11 transported on coating roll 31. As a result, coating material 12 is laminated on sheet material 11 and multi-layer sheet 10 is formed. Multi-layer sheet 10 is an example of a measurement target. Specifically, multi-layer sheet 10 is, for example, an adhesive tape.

The method of applying coating material 12 to sheet material 11 is not limited to the method of using coating device 33. For example, coating material 12 may be applied to sheet material 11 by passing sheet material 11 through a tank filled with coating material 12. Alternatively, coating material 12 may be applied to sheet material 11 by contacting the roll, in which coating material 12 is applied, with sheet material 11 separately. Coating material 12 may be applied to both surfaces of sheet material 11.

In the above description, the configuration in which multi-layer sheet 10 is configured with two layers of a base material and a resin layer has been described as an example, but the present disclosure is not limited to this. For example, multi-layer sheet 10 may be configured with a multi-layer structure constituted by a plurality of coating layers and a plurality of base materials. When forming multi-layer sheet 10, a step of drying coating material 12 with a heater, warm air, or the like may be provided after coating material 12 is applied on sheet material 11 which will be described later.

Winding roll 40 of sheet producing device 1 is provided such that the rotation axis is parallel to the X-axis at a position more supply direction side (on the side in the −Y direction) of sheet material 11 than coating device 33. Winding roll 40 is rotated by being driven by a motor or the like and winds multi-layer sheet 10. In the above description, the example in which the step of winding multi-layer sheet 10 with winding roll 40 is provided has been described, but the present disclosure is not limited to this. For example, a cutting step for cutting into a sheet of a certain length may be provided without providing a winding step. Multi-layer sheet 10 may be continuously connected to the subsequent steps without providing the winding step.

SS-OCT device 50 of sheet producing device 1 outputs various information used for calculating the thickness of sheet material 11 and the thickness of coating material 12 constituting multi-layer sheet 10 to sheet generation controller 60. The detailed configuration of SS-OCT device 50 will be described later.

Sheet generation controller 60 includes operation controller 61, thickness calculator 62, determiner 63, storage 64, display 65, and the like, and controls the operation of entire sheet producing device 1.

Operation controller 61 controls a generation operation of multi-layer sheet 10.

Thickness calculator 62 calculates the thickness of sheet material 11 and the thickness of coating material 12 based on the information from SS-OCT device 50.

Determiner 63 determines the quality of multi-layer sheet 10 (whether it is a product with OK status or a product with NG status) based on the thickness calculation result by thickness calculator 62.

Storage 64 stores the fact that multi-layer sheet 10 is a product with NG status in association with a serial number or the like that is attached to multi-layer sheet 10.

Display 65 displays whether multi-layer sheet 10 is a product with OK status or a product with NG status based on the determination result by determiner 63.

Regarding SS-OCT Device

Figure 2:
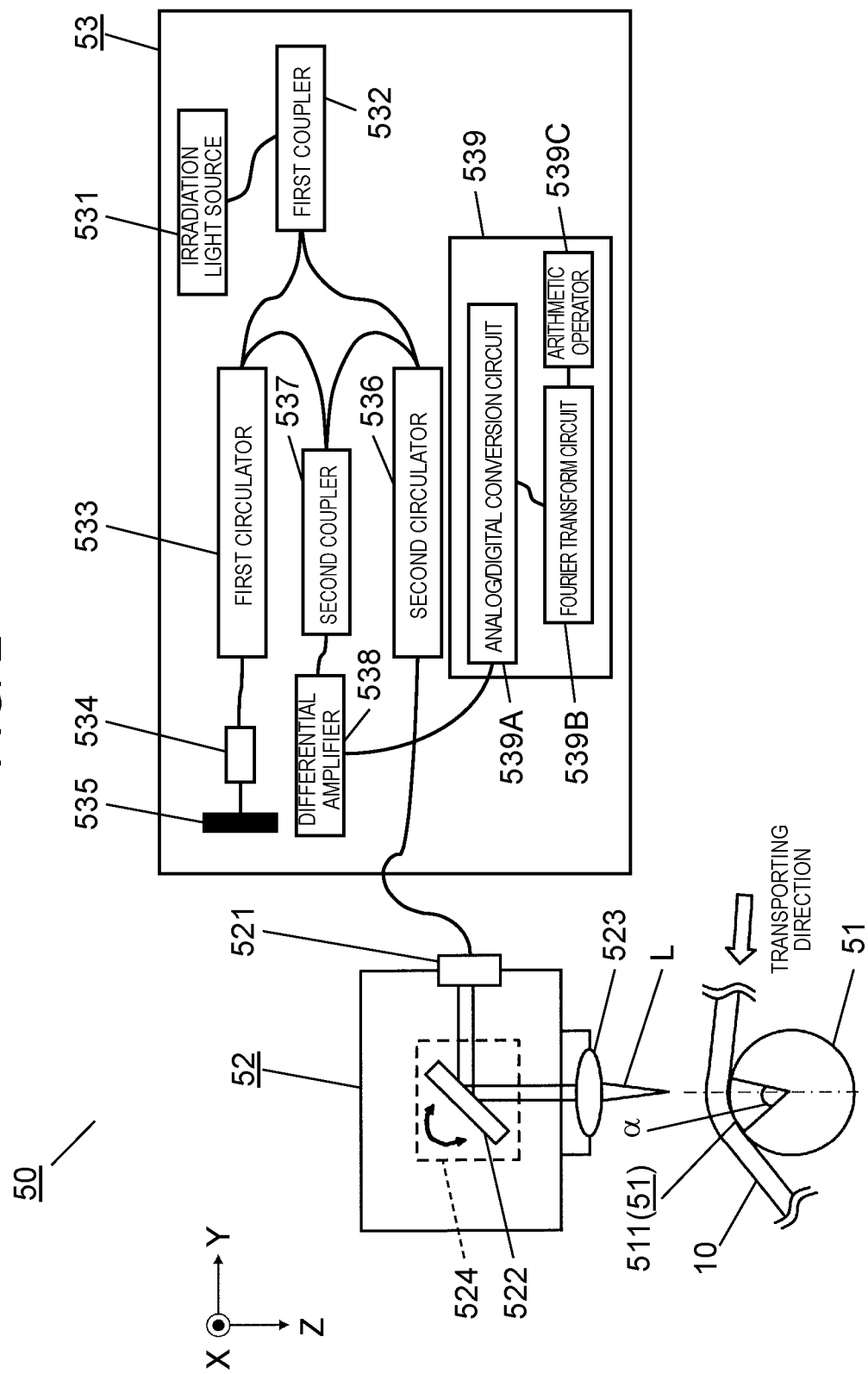
FIG. 2 is a schematic view illustrating a configuration of an SS-OCT device according to Exemplary Embodiment 1 and Exemplary Embodiment 2 of the present disclosure.

Next, the configuration of SS-OCT device 50 will be described with reference to FIG. 2. FIG. 2 is a schematic view illustrating a configuration of the SS-OCT device.

SS-OCT device 50 is an example of an inspection device. SS-OCT device 50 is an optical interference signal measurement device using a wavelength scanning type swept source-optical coherence tomography (SS-OCT).

An optical coherence tomography (OCT) is a measurement method using an optical interference phenomenon. Specifically, the OCT divides the radiation light from the light source into reference light and measurement light L, makes the reference light incident on the reference surface, and makes measurement light L incident on the measurement target. The interference signal is detected by interfering with the reference light that is reflected by the reference surface with measurement light L that is reflected by the measurement target. The OCT detects a position of the measurement target based on the detected interference signal.

There are roughly two types of OCT: time domain OCT (TD-OCT: time domain optical coherence tomography), which requires scanning of the reference surface, and frequency domain OCT (FD-OCT: Fourier domain optical coherence tomography), which does not require scanning of the reference surface. There are two types of FD-OCT, a spectrometer type and a wavelength scanning type. In particular, the wavelength scanning type FD-OCT is referred to as the SS-OCT described above. The SS-OCT detects the interference light while changing the frequency of light emitted from the light source over time.

SS-OCT device 50 includes inspection roll 51, measurement head 52, optical fiber interferometer 53, and the like.

Inspection roll 51 is provided between coating roll 31 and winding roll 40 such that the rotation axis is parallel to the X-axis. Inspection roll 51 is provided such that multi-layer sheet 10 is in contact with inspection roll 51 at holding angle α. Therefore, a contact surface between inspection roll 51 and multi-layer sheet 10 is arc surface 511.

Measurement head 52 functions as an example of an optical member. Measurement head 52 includes irradiation collimating lens 521, galvanometer mirror pair 522, objective lens 523, driver 524, and the like. The galvanometer mirror pair means a pair of galvanometer mirrors, and the same applies hereinafter.

Irradiation collimating lens 521 is connected to second circulator 536 of optical fiber interferometer 53, which will be described later. Irradiation collimating lens 521 converts measurement light L entered from second circulator 536 into parallel light. The parallel light is emitted to galvanometer mirror pair 522.

Galvanometer mirror pair 522 is disposed an upper side of inspection roll 51. Galvanometer mirror pair 522 includes a first mirror having a rotation axis that is parallel to the X-axis and a second mirror having a rotation axis that is parallel to the Y-axis. Galvanometer mirror pair 522 reflects the parallel light entered from irradiation collimating lens 521 and emits the reflected parallel light to objective lens 523.

Objective lens 523 is provided between galvanometer mirror pair 522 and inspection roll 51. Objective lens 523 collects the parallel light entered from galvanometer mirror pair 522 and irradiates multi-layer sheet 10 with the collected parallel light. Objective lens 523 is provided so as to configure a telecentric optical system in combination with galvanometer mirror pair 522. Therefore, the incident position of measurement light L changes in the XY plane (horizontal plane) depending on the movement of the first mirror and the second mirror of galvanometer mirror pair 522, but the incident angle of measurement light L on the incident position is configured so as not to change.

Driver 524 moves the first mirror and the second mirror of galvanometer mirror pair 522 to adjust the incident position of measurement light L with respect to multi-layer sheet 10.

With the above configuration of measurement head 52, measurement light L is incident on irradiation collimating lens 521 from second circulator 536. As described above, the entered measurement light L passes through galvanometer mirror pair 522, is collected by objective lens 523 and is incident on the front surface of multi-layer sheet 10. Measurement light L incident on the front surface of multi-layer sheet 10 is reflected (or back scattering) by the front surface, the inside, and the back surface of multi-layer sheet 10 and inspection roll 51. Reflected measurement light L is emitted to second circulator 536 via objective lens 523, galvanometer mirror pair 522, and irradiation collimating lens 521.

Optical fiber interferometer 53 functions as an example of the light source unit. Optical fiber interferometer 53 includes radiation light source 531, first coupler 532, first circulator 533, reference collimating lens 534, reference surface 535, second circulator 536, second coupler 537, differential amplifier 538, OCT arithmetic operation processor 539, and the like.

Radiation light source 531 emits the radiation light. Radiation light source 531 is configured such that the wavelength of the radiation light can be changed. A light emitting port of radiation light source 531 is connected to a light receiving port of first coupler 532.

First coupler 532 functions as an example of a division part that divides the light entered from radiation light source 531 into two at a fixed ratio of, for example, 50:50. First coupler 532 has a first light sending port and a second light sending port (not illustrated). The first light sending port is connected to first circulator 533. The second light sending port is connected to second circulator 536. With this configuration, the radiation light incident on first coupler 532 from radiation light source 531 is divided into the reference light and measurement light L. The reference light is emitted to first circulator 533, and measurement light L is emitted to second circulator 536.

First circulator 533 is connected to the light receiving port of second coupler 537. First circulator 533 emits the reference light entered from first coupler 532 to reference collimating lens 534. The reference light incident on reference collimating lens 534 is reflected by reference surface 535 and emitted to first circulator 533 via reference collimating lens 534. First circulator 533 emits the reference light reflected by reference surface 535 to second coupler 537.

Second circulator 536 is connected to the light receiving port of second coupler 537 and the light receiving port of irradiation collimating lens 521 of measurement head 52. As a result, second circulator 536 emits measurement light L entered from first coupler 532 to measurement head 52 and emits measurement light L from measurement head 52 to second coupler 537.

Second coupler 537 is connected to differential amplifier 538. Second coupler 537 forms the interference light by the reference light from first circulator 533 and measurement light L from second circulator 536. That is, second coupler 537 functions as an example of a multiplexer of the reference light and measurement light L.

Differential amplifier 538 differentially transmits an optical beat signal of the interference light formed by second coupler 537 to OCT arithmetic operation processor 539. At this time, the frequency of the radiation light that is emitted from radiation light source 531 changes with the passage of time. Therefore, in second coupler 537, a frequency difference is generated between the interfering reference light and measurement light L according to the amount of time delay. This frequency difference becomes the optical beat signal of the interference light.

OCT arithmetic operation processor 539 includes analog/digital conversion circuit 539A (analog/digital converter), Fourier transform circuit (Fourier transform portion) 539B, arithmetic operator 539C, and the like. Fourier transform circuit 539B functions as an interference detector, and arithmetic operator 539C functions as a profile acquisition portion.

Analog/digital conversion circuit 539A is connected to differential amplifier 538. Analog/digital conversion circuit 539A converts, from analog to digital, a time waveform of the optical beat signal of the interference light that is formed by differential amplifier 538.

Fourier transform circuit 539B is connected to analog/digital conversion circuit 539A. Fourier transform circuit 539B detects the optical beat signal of the interference light from analog/digital conversion circuit 539A. Fourier transform circuit 539B fourier-transforms the detected optical beat signal and performs a frequency analysis. As a result, Fourier transform circuit 539B obtains an SS-OCT signal that represents the intensity distribution of the interference light.

An input of arithmetic operator 539C is connected to Fourier transform circuit 539B. Arithmetic operator 539C calculates a reflected signal intensity profile, which is an intensity profile of the interference light, at the incident position of measurement light L, based on the information (SS-OCT signal) input from Fourier transform circuit 539B. Hereinafter, a process of acquiring the one-dimensional reflected signal intensity profile in the incident direction at the position of one point where measurement light L is entered will be described as an "A scan".

An output of arithmetic operator 539C is connected to radiation light source 531, driver 524 such as galvanometer mirror pair 522 of measurement head 52, and sheet generation controller 60 (see FIG. 1). Arithmetic operator 539C controls driver 524 to operate galvanometer mirror pair 522. Specifically, arithmetic operator 539C performs the above-mentioned A scan while changing the incident position of measurement light L. As a result, arithmetic operator 539C acquires the reflected signal intensity profile at the incident position of measurement light L that is changed linearly and creates a two-dimensional image. Hereinafter, a process of acquiring the reflected signal intensity profile at the incident positions of a plurality of measurement lights, which are made into a two-dimensional image, will be described as a "B scan", and the obtained two-dimensional image will be described as a "B scan image".

Sheet generation controller 60 that is illustrated in FIG. 1 performs a predetermined operation such as calculating the thickness of multi-layer sheet 10 based on the information obtained by the A scan or the B scan under the control of arithmetic operator 539C.

The above-mentioned TD-OCT may be adopted in the above-described Exemplary Embodiment 1 and Exemplary Embodiment 2 described later. However, when TD-OCT is adopted, it is desirable to use SS-OCT or SD-OCT, which can be performed at, for example, 10 kHz or higher, as the one-dimensional scan called A scan described above. As a result, the speed of measuring the thickness of multi-layer sheet 10 can be increased.

Regarding Measurement Head Installation Position and Scanning Direction

Next, an installation position and a scanning direction of measurement head 52 will be described with reference to FIG. 2.

As described above, multi-layer sheet 10 is in contact with an outer peripheral surface of inspection roll 51 at holding angle α. Measurement head 52 is installed such that measurement light L is able to be perpendicularly incident on arc surface 511 in which inspection roll 51 and multi-layer sheet 10 are in contact with each other within an operating range of galvanometer mirror pair 522. With this configuration, the refraction of measurement light L between the air and multi-layer sheet 10 can be suppressed. Therefore, the thickness of multi-layer sheet 10 can be measured more accurately.

The rotation axis of the second mirror of galvanometer mirror pair 522 is disposed parallel to the Y-axis. With this configuration, the incident position of measurement light L can be moved in the axial direction of inspection roll 51, that is, in the X-axis direction, and the B scan can be performed.

Sheet Producing Method

Figure 3:
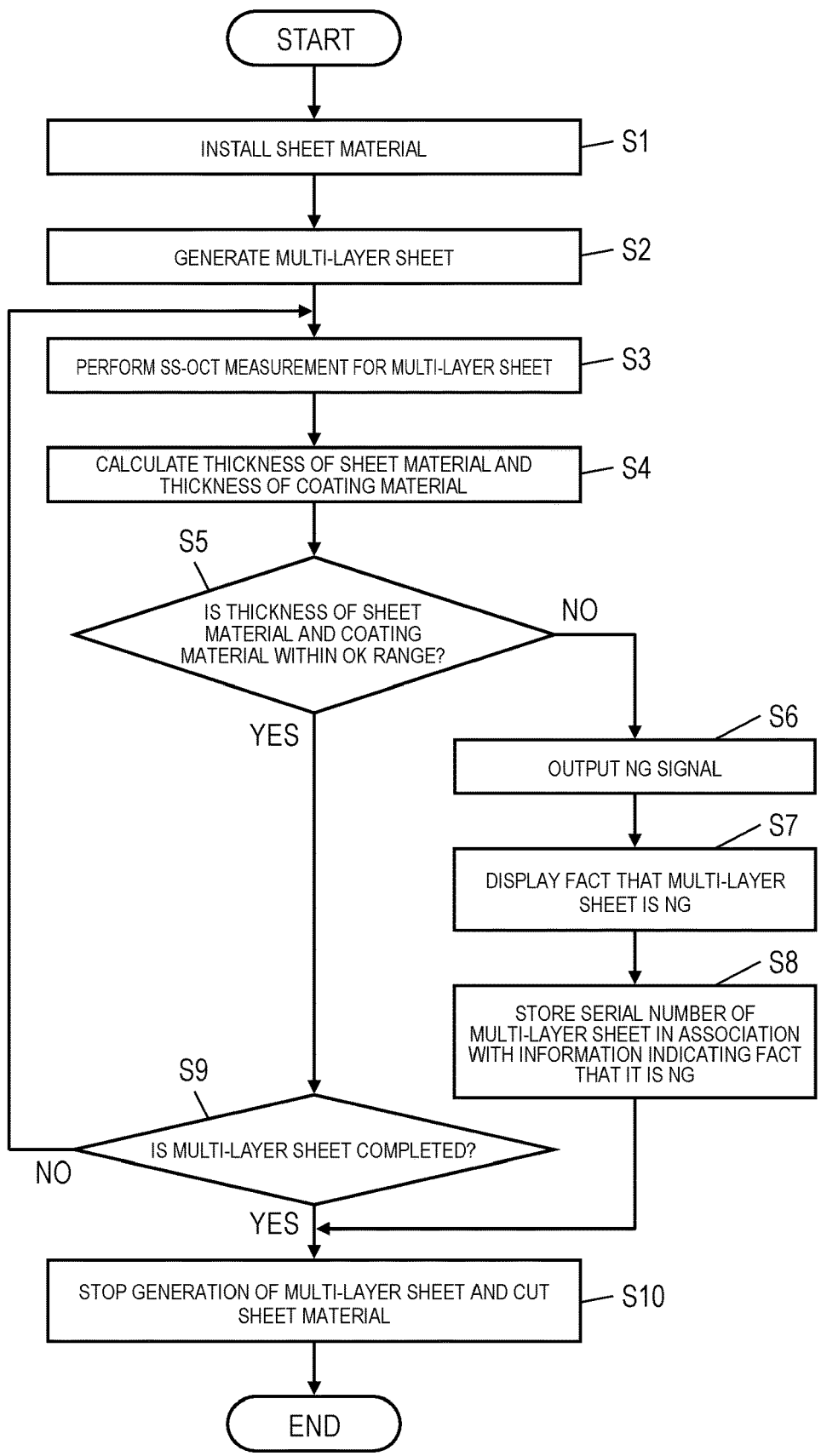
FIG. 3 is a flowchart illustrating a sheet producing method according to Exemplary Embodiment 1.

Next, the sheet producing method by sheet producing device 1 will be described by using FIG. 3 with reference to FIGS. 1 and 2. FIG. 3 is a flowchart illustrating a sheet producing method.

First, as illustrated in FIG. 3, sheet material 11 is installed on winding roll 40, for example, by extending an end portion of the winding of sheet material 11 that is wound around sheet supply reel 20 illustrated in FIG. 1 (step S1). Step S1 may be configured to be performed by a worker or automatically performed by a grip portion after providing the grip portion that grips sheet material 11. As a method of installing sheet material 11 on the winding roll 40, for example, a method of providing an open and close type slit in winding roll 40 and holding sheet material 11 in the slit can be exemplified.

Next, multi-layer sheet 10 is generated (step S2). Specifically, operation controller 61 of sheet generation controller 60 rotates winding roll 40 in the counterclockwise direction. At this time, operation controller 61 transports sheet material 11 and at the same time sends coating material 12 from coating supply device 32 to coating device 33. As a method of sending coating material 12, for example, pressure sending by compressed air or the like, or a pump such as a diaphragm pump may be used. As a result, coating material 12 is applied to the front surface of sheet material 11 and multi-layer sheet 10 is generated. The generated multi-layer sheet 10 is continuously wound on winding roll 40.

Next, SS-OCT device 50 performs the SS-OCT measurement with respect to multi-layer sheet 10 while transporting multi-layer sheet 10 (step S3).

The details of SS-OCT device 50 will be specifically described.

First, SS-OCT device 50 measures the thickness of multi-layer sheet 10 while changing the wavelength of the radiation light emitted from radiation light source 531. At this time, the range in which the wavelength is changed is, for example, a range of 1550 nm±100 nm. Within this range, the transmittance of radiation light with respect to sheet material 11 and coating material 12 can be enhanced. The operation of radiation light source 531 is controlled by arithmetic operator 539C. The radiation light from radiation light source 531 enters the front surface of multi-layer sheet 10 from the −Z direction.

The wavelength of the radiation light emitted from radiation light source 531 may be a wavelength outside the range of 1550 nm±100 nm. As a result, when the center wavelength is shortened, the resolution is high, and when the center wavelength is lengthened, the effect of being less susceptible to scattering from the measurement target can be obtained. Radiation light source 531 may emit the radiation light including light having a plurality of wavelengths within the range of 1550 nm±100 nm. In this case, one light source may emit the radiation light including light having a plurality of wavelengths, or a plurality of light sources capable of emitting light having different wavelengths may be used. As a result, it becomes easier to select the wavelength to be used.

Measurement light L incident on multi-layer sheet 10 is reflected (or backscattered) by the front surface, the inside, and the back surface of multi-layer sheet 10 and inspection roll 51. Measurement light L reflected by multi-layer sheet 10 proceeds to second coupler 537. In second coupler 537, measurement light L reflected by multi-layer sheet 10 and the reference light reflected by reference surface 535 interfere with each other to form the interference light. The optical beat signal of the formed interference light is detected by Fourier transform circuit 539B of OCT arithmetic operation processor 539 via differential amplifier 538.

Arithmetic operator 539C of OCT arithmetic operation processor 539 frequency-analyzes the optical beat signal of the interference light detected by Fourier transform circuit 539B to acquire the SS-OCT signal. Arithmetic operator 539C calculates the B scan image based on the acquired SS-OCT signal. The calculated B scan image is a two-dimensional imaged reflected signal intensity profile as described above.

The B scan image calculated by arithmetic operator 539C is output to sheet generation controller 60 together with the information about the incident position of measurement light L. At this time, as described above, the incident position of measurement light L on multi-layer sheet 10 is in contact with inspection roll 51. Therefore, the incident position of measurement light L is stable against vibration and the like. As a result, highly accurate inspection (measurement) of the thickness of multi-layer sheet 10, for example, becomes possible.

In the OCT device, when the infrared light having a wavelength of 1550 nm±100 nm is used as measurement light L (radiation light) as described above, measurement light L can pass through the resin. When measurement light L passes through the resin, scattered light is generated inside the resin due to additives such as fillers inside the resin or non-uniformity of the refractive index inside the resin. The generated scattered lights strengthen each other, and a random speckle pattern is generated. This speckle pattern is not desirable because it affects the calculation of thickness $\Delta Zs$ and thickness $\Delta Zt$ in step S4 described later.

Therefore, in the process of step S3, thickness calculator 62 of sheet generation controller 60 emits measurement light L from at least a plurality of angles with respect to multi-layer sheet 10 to perform the B scan. Thickness calculator 62 obtains a plurality of B scan images having different generation patterns of speckle and averages the B scan images. As a result, an averaged image from which speckles are removed is obtained. The averaging process will be described later.

Next, as illustrated in FIG. 3, thickness calculator 62 of sheet generation controller 60 calculates thickness $\Delta Zs$ of sheet material 11 and thickness $\Delta Zt$ of coating material 12 based on the averaged image obtained above (step S4). A specific description of the calculation of thickness $\Delta Zs$ and thickness $\Delta Zt$ will be described later.

Next, determiner 63 determines whether or not thickness $\Delta Zs$ and thickness $\Delta Zt$ calculated in step S4 are within an OK range (step S5). The OK range is a range in which the product can be regarded as a non-defective product. Specifically, the OK range is a range of thickness $\Delta Zs$ and thickness $\Delta Zt$ that does not cause a problem in product quality. The OK range is stored in advance in storage 64. The details of the OK range stored in advance will be described later.

At this time, when it is determined that thickness $\Delta Zs$ and thickness $\Delta Zt$ are not within the OK range (NO in step S5), determiner 63 outputs an NG signal to display 65 (step S6). Based on the NG signal, display 65 displays the fact that the formed multi-layer sheet 10 is NG (step S7). Determiner 63 associates the serial number and the like attached to multi-layer sheet 10 with the information indicating that it is NG, and stores the information in storage 64 (step S8). As a result, in the subsequent step, the information stored in storage 64 can be compared with the serial number of multi-layer sheet 10 and the like, and the NG product can be more reliably discarded.

On the other hand, when determiner 63 determines that thickness $\Delta Zs$ and thickness $\Delta Zt$ are within the OK range (YES in step S5), operation controller 61 determines whether or not multi-layer sheet 10 is completed (step S9). In this case, operation controller 61 determines whether or not multi-layer sheet 10 is completed based on the information from the encoder or the like connected to winding roll 40. Specifically, for example, first, operation controller 61 obtains the number of rotations of winding roll 40 from the information from the encoder. Thereafter, it is determined whether or not the obtained number of rotations reaches the number of times stored in storage 64 in advance. The number of times stored in advance is, for example, 10 times.

At this time, when it is determined that multi-layer sheet 10 is not completed (for example, less than 10 times) (NO in step S9), operation controller 61 does not end the generation of multi-layer sheet 10, returns to step S3 and performs the SS-OCT measurement again.

On the other hand, when it is determined that multi-layer sheet 10 is completed (YES in step S9), or when the process of step S8 is performed, operation controller 61 ends the coating operation of coating device 33. Thereafter, sheet material 11 from sheet supply reel 20 to coating roll 31 is cut by a cutting part (not illustrated) (step S10), and the sheet producing operation of multi-layer sheet 10 is ended.

When step S7 or step S8 is performed, step S10 may be performed at the same time. As a result, the range of NG of the multi-layer sheet can be minimized.

The above steps S3 to S5 are examples of inspection steps. That is, in Exemplary Embodiment 1, the inspection step is performed at the same time while multi-layer sheet 10 is being generated. As a result, the time required from the start of the generation of multi-layer sheet 10 to the end of the inspection can be shortened.

Regarding the Position of the Measurement Light in the Y Direction in the Averaging Process of a Plurality of B Scan Images Next, the position of the measurement light in the Y direction in the averaging process of the plurality of B scan images in step S3 illustrated in FIG. 3 will be described with reference to FIGS. 4A to 5C.

Figure 4A:
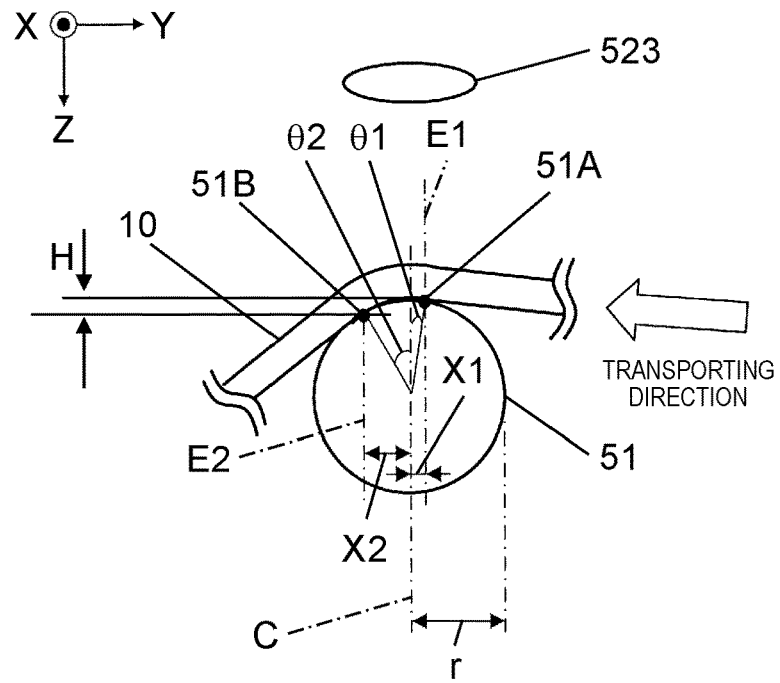
FIG. 4A is a YZ plan view illustrating a positional relationship between objective lens of the SS-OCT device and a multi-layer sheet according to Exemplary Embodiment 1 and Exemplary Embodiment 2.
Figure 4B:
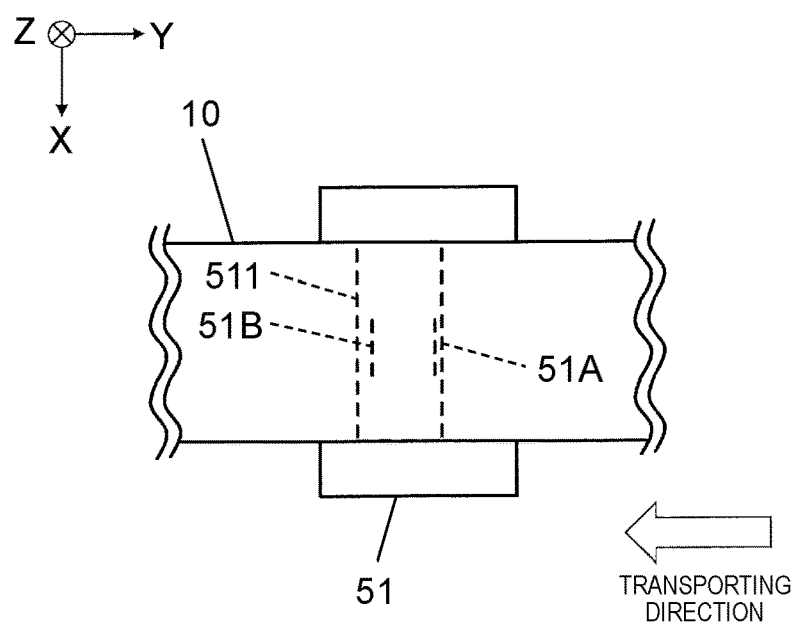
FIG. 4B is an XY plan view illustrating a positional relationship between an inspection roll of the SS-OCT device and the multi-layer sheet according to Exemplary Embodiment 1 and Exemplary Embodiment 2.
Figure 5A:
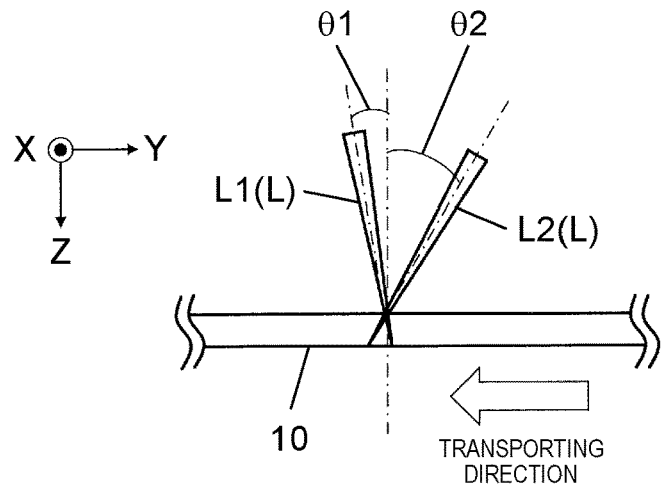
FIG. 5A is a schematic view illustrating a positional relationship between measurement light when a B scan is performed and the multi-layer sheet at a B scan position that is different on the inspection roll and the same on the multi-layer sheet according to Exemplary Embodiment 1 and Exemplary Embodiment 2.
Figure 5B:
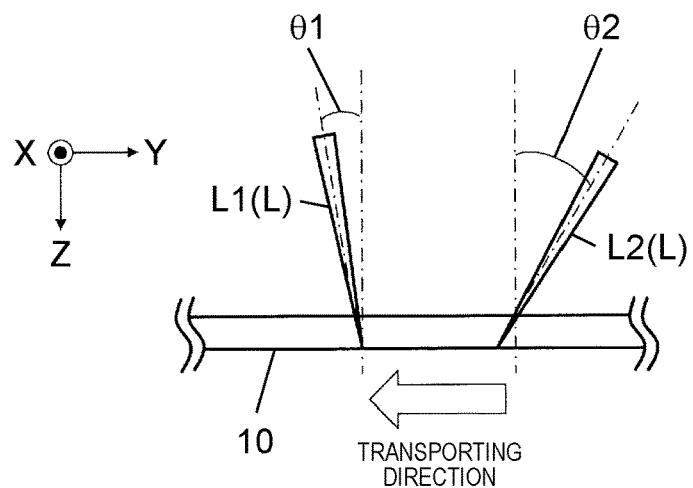
FIG. 5B is a schematic view illustrating a positional relationship between the measurement light when the B scan is performed and the multi-layer sheet at the B scan position that is different on the inspection roll and also different on the multi-layer sheet according to Exemplary Embodiment 1 and Exemplary Embodiment 2.
Figure 5C:
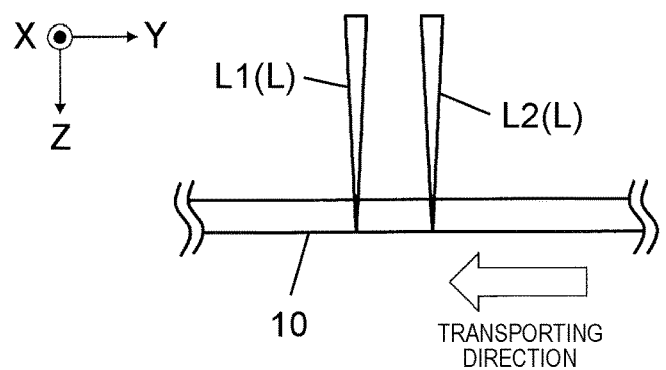
FIG. 5C is a schematic view illustrating a positional relationship between the measurement light when the B scan is performed and the multi-layer sheet at the B scan position that is the same on the inspection roll and different on the multi-layer sheet in a state in which a transporting speed of the multi-layer sheet is reduced according to Exemplary Embodiment 1 and Exemplary Embodiment 2.

FIG. 4A is a YZ plan view illustrating a positional relationship between objective lens 523 of SS-OCT device 50 and multi-layer sheet 10. FIG. 4B is an XY plan view illustrating a positional relationship between inspection roll 51 of SS-OCT device 50 and multi-layer sheet 10. FIG. 5A is a schematic view illustrating a positional relationship between measurement light L when a B scan is performed and multi-layer sheet 10 at a B scan position that is different on inspection roll 51 and the same on multi-layer sheet 10. FIG. 5B is a schematic view illustrating a positional relationship between measurement light L when a B scan is performed and multi-layer sheet 10 at a B scan position that is different on inspection roll 51 and also different on multi-layer sheet 10. FIG. 5C is a schematic view illustrating a positional relationship between measurement light L when the B scan is performed and multi-layer sheet 10 at the B scan position that is the same on inspection roll 51 and different on multi-layer sheet 10 in a state in which a transporting speed of multi-layer sheet 10 is reduced.

In a case where a plurality of B scan images are averaged, when there is a variation in the thickness inside the surface of multi-layer sheet 10, the different the B scan position corresponding to the B scan image, the different the generation pattern of speckle. In this case, unlike the above-mentioned averaging of the same part, B scan images of different parts are averaged. Therefore, the calculation accuracy of thickness ΔZs and thickness ΔZt performed in step S4 becomes low.

Hereinafter, a positional relationship between measurement light L and multi-layer sheet 10 in FIGS. 5A to 5C will be specifically described by dividing them into terms (A, B, C).

(A: Averaging B scan images, which can be obtained by B scans, at different B scan positions on the inspection roll and the same B scan position on the multi-layer sheet (front surface))

In Exemplary Embodiment 1 and Exemplary Embodiment 2 described later, as illustrated in FIG. 5A, the B scan position on inspection roll 51 is shifted by a predetermined amount in parallel with the transporting direction of multi-layer sheet 10, that is, the Y direction. From the viewpoint of multi-layer sheet 10, a B scan image is acquired by performing a B scan with respect to the same B scan position on the front surface of multi-layer sheet 10 under the same condition. The amount of shifting is determined by thickness calculator 62 of sheet generation controller 60 based on the transporting speed of multi-layer sheet 10.

As illustrated in FIGS. 4A and 4B, the radius of inspection roll 51 is defined as r, and the line passing through the center of inspection roll 51 and extending in the gravity direction is defined as center line C. An angle formed by a line, which connects a position on inspection roll 51 in which measurement light L is incident on during a first B scan and a center of inspection roll 51, and the gravity direction that is parallel to the Z-axis (center line C) is defined as θ1. Further, a distance along the horizontal direction (Y direction) from a first B scan position 51A, which is first interference light at a first position, to center line C is defined as X1. Hereinafter, the position may be referred to as "first B scan position 51A".

In this case, radius r, angle θ1, and distance X1 satisfy the following Equation (1).

$$X1 = r \times \cos\theta1 \quad (1)$$

At this time, since distance X1 is a known value if the positional relationship between inspection roll 51 and measurement head 52 is fixed, angle θ1 is also a known value.

A rotation angle of the inspection roll at a time interval in which the B scan is performed is defined as AO, and a distance along the horizontal direction (Y direction) from a position on inspection roll 51, in which measurement light L is entered during a second B scan, to center line C is defined as X2. Hereinafter, the above position may be referred to as "second B scan position 51B" which is second interference light at a second position.

In this case, radius r, angle θ1, angle AO, and distance X2 satisfy the following Equation (2).

$$X2 = r \times \cos(\theta1 + \Delta\theta) \quad (2)$$

Therefore, thickness calculator 62 controls driver 524 to operate galvanometer mirror pair 522 such that first B scan position 51A becomes a position satisfying Equation (1) and second B scan position 51B becomes a position satisfying Equation (2).

In this case, the two B scan images obtained by the first B scan and the second B scan are images illustrating different B scan positions on inspection roll 51.

That is, as illustrated in FIG. 5A, when viewed from multi-layer sheet 10, the images have the same incident position of measurement light L on multi-layer sheet 10 (front surface) but different incident angles. Due to the effect that multi-layer sheet 10 is bent along arc surface 511 of inspection roll 51, the incident angle of measurement light L1 in the first B scan is θ1, and the incident angle of measurement light L2 in the second B scan is θ2. Therefore, the generation patterns of speckle of the two B scan images are different. Two different B scan images are averaged. As a result, the speckle can be removed. Further, since the same measurement position is maintained on multi-layer sheet 10, the calculation accuracy of thickness ΔZs and thickness ΔZt performed in step S4 illustrated in FIG. 3 is not lowered.

On the other hand, with respect to a part of multi-layer sheet 10 (for example, the part positioned between inspection roll 51 and coating roll 31) which is linearly transported without bending along inspection roll 51, when the first and second B scans are performed under the same condition as above, the incident angles of the measurement lights in the two B scan images are equal to each other. Therefore, the generation patterns of speckle are also the same. As a result, even when the obtained two B scan images are averaged, the speckle cannot be removed. That is, the configuration for obtaining a B scan image at the part of multi-layer sheet 10 is not desirable.

The movement of the B scan position can be performed by changing the angle of galvanometer mirror pair 522, but the present disclosure is not limited to this. Instead of using galvanometer mirror pair 522, for example, a mechanism such as a stepping motor may be provided to move measurement head 52 itself. As a result, the same effect can be obtained without using an expensive galvanometer mirror.

(B: Averaging B scan images, which can be obtained by B scans, at different B scan positions on the inspection roll and also different B scan positions on the multi-layer sheet (front surface))

When there is no variation in the thickness of multi-layer sheet 10 in the plane, the incident positions of the measurement light in the plurality of B scans may be significantly different. In this case, it is more desirable that the incident position of the measurement light is largely shifted by, for example, equal to or larger than the spot diameter of the measurement light. Thereby, the effect of removing the speckle can be enhanced.

At that time, as illustrated in FIG. 5B, with respect to the incident position (corresponding to the first position) of measurement light L1 of the first B scan on multi-layer sheet 10, the incident position (corresponding to the second position) of measurement light L2 of the second B scan is set to be positioned on the rear side of multi-layer sheet 10 in the transporting direction. As a result, it is possible to generate a large difference in the position of the measurement light while suppressing the amount of change in the angle of the galvanometer mirror pair 522. Further, it is possible to surely prevent measurement light L1 and measurement light L2 from being incident on the same part. As a result, it is more desirable because it can make a large difference in the generation patterns of speckle.

With respect to the incident position (corresponding to the first position) of measurement light L1 of the first B scan, the incident position (corresponding to the second position) of measurement light L2 of the second B scan may be set to be positioned on the front side of multi-layer sheet 10 in the transporting direction. With this configuration, the same part of multi-layer sheet 10 can be measured by using the measurement light entered from different angles.

An interval between the incident position of measurement light L1 of the first B scan and the incident position of measurement light L2 of the second B scan is desirably the same as a distance at which multi-layer sheet 10 is transported from the start of the incident of measurement light L1 of the first B scan to the start of the incident of measurement light L2 of the second B scan. With this configuration, the measurement light can be incident on the same part during the transportation of multi-layer sheet 10 to make the B scan position the same. Thereby, the B scan images of the same part can be averaged. As a result, it is possible to suppress a decrease in the calculation accuracy of thickness $\Delta Zs$ and thickness $\Delta Zt$, which is performed in step S4 illustrated in FIG. 3.

As described above, when the first B scan and the second B scan are performed, in the case illustrated in FIG. 5A, the incident angle of the measurement light is different but the incident position is the same, in multi-layer sheet 10. On the other hand, in the case illustrated in FIG. 5B, both the incident angle of the measurement light (incident angle $\theta 1$ of measurement light L1 in the first B scan incident angle $\theta 2$ of measurement light L2 in the second B scan) and the incident position are different.

(C: Averaging B scan images, which can be obtained by B scans, at the same B scan position on the inspection roll and different B scan positions on the multi-layer sheet (front surface))

In general, even when there is no variation in the thickness of multi-layer sheet 10 in the plane, it is not desirable to continue the B scan at the same position on inspection roll 51 because the speckle may not be sufficiently removed due to the following situations and the like.

For example, there is a case where multi-layer sheet 10 momentarily stops or the transporting speed decreases during the transportation because of the slack of multi-layer sheet 10 due to disturbance or fluctuation of tension. In this case, the incident positions of the measurement lights may be the same or extremely close to each other. Therefore, there is a possibility that the speckle cannot be sufficiently removed, which is not desirable.

In the above situation, as illustrated in FIG. 5C, the incident angle of measurement light L1 of the first B scan and the incident angle of measurement light L2 of the second B scan on multi-layer sheet 10 become the same. Therefore, the difference between the incident positions of measurement light L1 and measurement light L2 becomes the length obtained by multiplying the transporting speed by the time interval of each of the B scans. That is, when the transporting speed becomes close to 0 (zero) due to fluctuations in tension or the like since the same speckle pattern occurs in the first B scan and the second B scan, it is not desirable in the averaging process of the B scan image.

In A, B, and C described above, an example of averaging two B scan images has been described, but the present disclosure is not limited to this. For example, two or more B scan images may be averaged. As a result, the measurement tact is increased, and the speckle pattern can be removed more strongly.

Figure 6A:
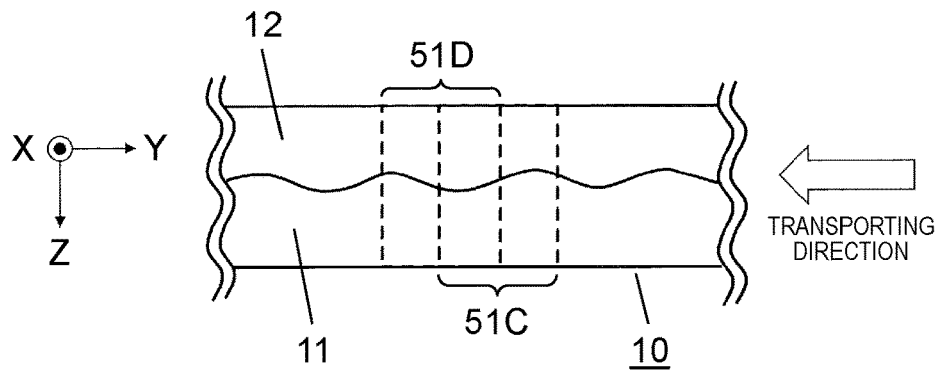
FIG. 6A is a cross-sectional view of a YZ plane illustrating a periodic structure of a sheet material of the multi-layer sheet according to Exemplary Embodiment 1 and Exemplary Embodiment 2.
Figure 6B:
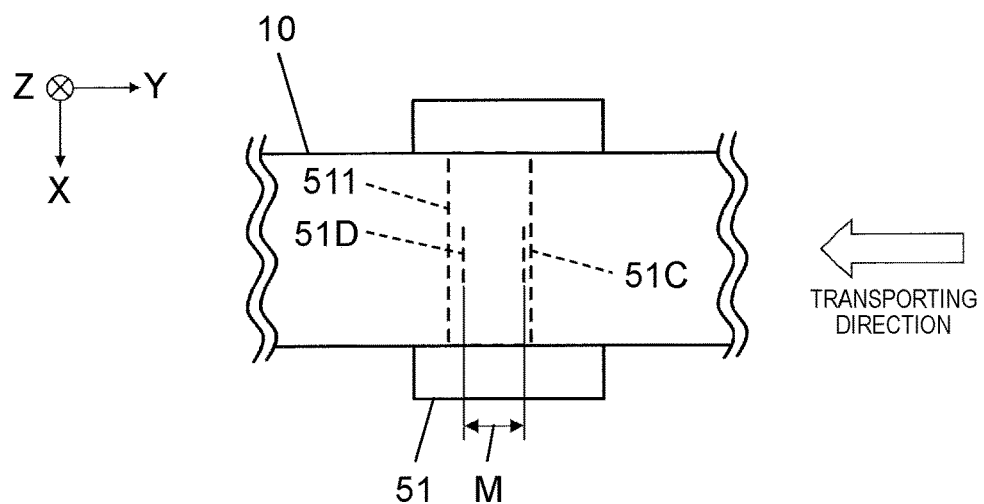
FIG. 6B is an XY plan view illustrating a positional relationship between the inspection roll of the SS-OCT device and the multi-layer sheet according to Exemplary Embodiment 1 and Exemplary Embodiment 2.
Figure 6C:
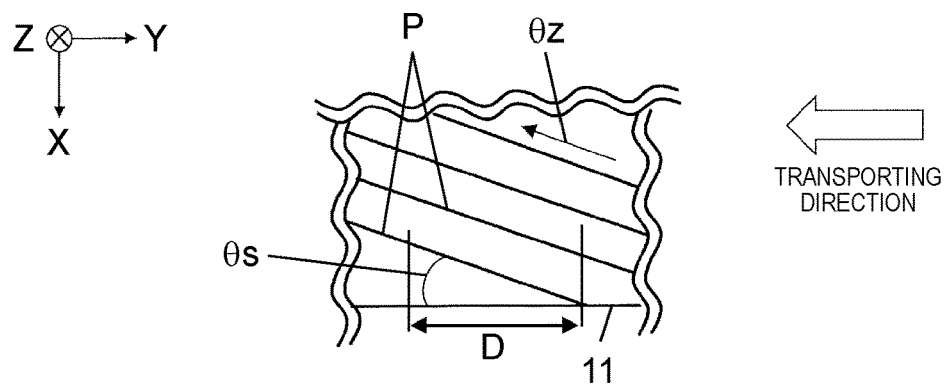
FIG. 6C is an XY plane view illustrating a periodic structure of the sheet material in the multi-layer sheet according to Exemplary Embodiment 1 and Exemplary Embodiment 2.

Regarding the Position of the Measurement Light in the Y Direction in the Averaging Process of a Plurality of B Scan Images of the Multi-Layer Sheet Having a Structure that is not Uniform in the X Direction Next, in the averaging process of the plurality of B scan images in step S3 illustrated in FIG. 3, a position of the measurement light in the Y direction in the averaging process of the B scan image of multi-layer sheet 10 having a structure that is not uniform in the X direction (width direction) will be described with reference to FIGS. 6A to 6C.

FIG. 6A is a cross-sectional view of a YZ plane illustrating a periodic structure of sheet material 11 in multi-layer sheet 10. FIG. 6B is an XY plan view illustrating a positional relationship between inspection roll 51 of SS-OCT device 50 and multi-layer sheet 10. FIG. 6C is an XY plane view illustrating a periodic structure of sheet material 11 in multi-layer sheet 10.

That is, even when the positions in the Y direction of multi-layer sheet 10 are the same, there is a case where different B scan images are obtained depending on the positions in the X direction.

Therefore, as illustrated in FIG. 6A, a case where the front surface of sheet material 11 is provided with a periodic uneven structure in the X direction in order to improve the adhesion with coating material 12 will be considered below.

Specifically, as illustrated in FIG. 6B, it is conceivable that a B scan image is obtained at first B scan position 51C and second B scan position 51D along a line parallel to the X direction and at different positions in the Y direction. In this case, when the phase of the periodic structure of sheet material 11 in the X direction is always constant regardless of the position in the Y direction, the periodic structure of the B scan image in the X direction is also constant regardless of the measurement position (first B scan position 51C and second B scan position 51D).

However, in general, the transporting direction of sheet material 11 is not a direction such that a specific phase portion (for example, the mountain portion having the periodic structure) having the periodic structure exists along the transporting direction unless a device such as an edge position controller (EPC) is used. That is, as illustrated in FIG. 6C, there is a case where specific phase portion P having the periodic structure becomes a direction that exists in the θz direction at inclined angle θs with respect to the transporting direction.

In this case, even when the averaging process may be performed by using the B scan images at first B scan position 51C and second B scan position 51D as they are, the speckle can be removed because the incident positions of the measurement light are different. However, since the periodic structures of sheet materials 11 in the two B scan images are different, the image that is obtained by the averaging process becomes unclear. Therefore, the calculation accuracy of thickness ΔZs and thickness ΔZt is lowered.

Therefore, the correction in the Y direction is performed based on the transporting distance of sheet material 11 and angle θs. Specifically, second B scan position 51D is offset in the Y direction with respect to first B scan position 51C by distance M satisfying the following Equation (3) based on transporting distance D and angle θs of the sheet material 11 between the two B scans so that the same position can be measured. As a result, it is possible to eliminate the phase shift of the periodic structure in the two B scan images.

$$M = D \times \tan \theta s \quad (3)$$

Angle θs may be acquired based on the phase difference between the two B scan images in the X direction. Angle θs may be acquired based on the result of detecting the position of sheet material 11 in the X-direction edge with a displacement meter (not illustrated).

In the above description, the case where the phase in the front surface structure of sheet material 11 is taken into consideration has been described as an example, but the present disclosure is not limited to this. For example, first B scan position 51C and second B scan position 51D may be adjusted as described above in consideration of the phase of the fiber structure of sheet material 11 itself. Even when the front surface of sheet material 11 has a non-periodic structure instead of a periodic structure, first B scan position 51C and second B scan position 51D may be adjusted as described above. The averaging process may be performed by combining the adjustment of the measurement light in the plurality of B scans described based on FIGS. 4A to 4B and 5A to 5B, and the adjustment of the measurement light in the plurality of B scans described based on FIGS. 6A to 6C. As a result, the effect of suppressing blurring of the image can be obtained while removing the speckle.

Regarding the Correction of B Scan Image Based on the Height of B Scan Position

Next, the correction of the B scan image based on the height of the B scan position will be described with reference to FIGS. 4A and 4B.

That is, an offset may occur in the height in the Z direction between first B scan position 51A and second B scan position 51B. This is because the shape of multi-layer sheet 10 along the Y direction is not a straight line. When the B scan images obtained at first B scan position 51A and second B scan position 51B having different heights are averaged, the accuracy of calculating thickness ΔZs and thickness ΔZt performed in step S4 illustrated in FIG. 3 will be reduced.

Therefore, the B scan image is corrected and then averaged. Thereby, the calculation accuracy of thickness ΔZs and thickness ΔZt can be improved.

Specifically, in the case illustrated in FIG. 4A, difference H between the height of first B scan position 51A and the height of second B scan position 51B is obtained based on the following Equation (4). Therefore, the B scan image at second B scan position 51B is offset in the Z direction by the obtained difference H.

$$H = r \times \{\sin \theta 1 - \sin(\theta 1 + \Delta \theta)\} \quad (4)$$

For example, in the first B scan image among the 100-pixel image in the height direction (Z direction), it is assumed that multi-layer sheet 10 is captured at the 50th pixel in the height, and in the second B scan image, it is assumed that multi-layer sheet 10 is captured at the 55th pixel in the height, shifted in the Z direction by height difference H.

In this case, as an offset, 5 pixels in the Z direction of the second B scan image are deleted. Thereby, the heights of multi-layer sheets 10 in the first B scan image and the second B scan image can be aligned. As a result, the calculation accuracy of thickness ΔZs and thickness ΔZt can be improved.

In addition to the above method, the first B scan image may be provided with extra 5 pixels in the height direction, and the heights of the multi-layer sheets 10 in the first B scan image and the second B scan image may be aligned. As a result, the same effect as described above can be obtained.

Figure 7A:
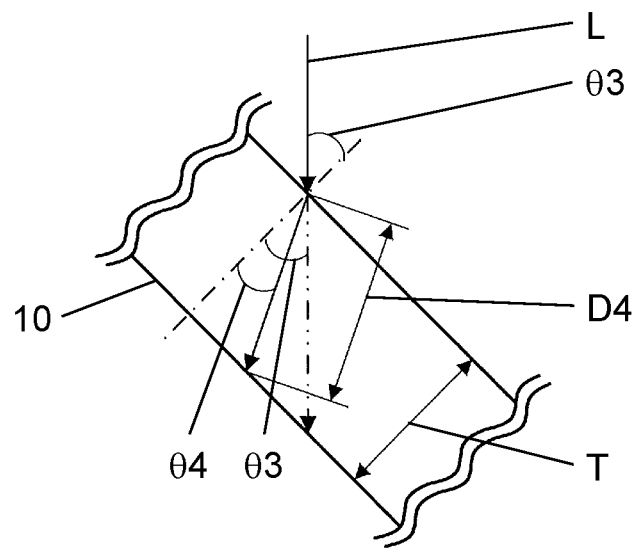
FIG. 7A is a schematic view illustrating a refraction state of the measurement light in the multi-layer sheet according to Exemplary Embodiment 1 and Exemplary Embodiment 2.

Regarding the Correction of B Scan Image Based on the Incident Angle of the Measurement Light Next, the correction of the B scan image based on the incident angle of the measurement light will be described with reference to FIG. 7A. FIG. 7A is a schematic view illustrating a refraction state of measurement light L in multi-layer sheet 10.

That is, when the incident angle of the measurement light with respect to multi-layer sheet 10 is not perpendicular, and when the refractive index of multi-layer sheet 10 is high with respect to air, the refraction generation of measurement light L is corrected. To be precise, the refractive indexes of coating material 12 and sheet material 11 of multi-layer sheet 10 are slightly different but are much smaller as compared with the difference in the refractive indexes of the air and the resin material.

Therefore, for the sake of simplicity, multi-layer sheet 10 will be described below assuming that multi-layer sheet 10 has a uniform refractive index n.

For example, as illustrated in FIG. 7A, measurement light L entered at an angle θ3 from the vertical direction, which is the thickness direction of multi-layer sheet 10, enters inside multi-layer sheet 10 at angle θ4 due to refraction by multi-layer sheet 10. The optical path length of the refracted light is defined as D4.

At this time, angle θ3 and angle θ4 have a relationship of the following Equation (5).

$$\sin \theta 3 = n \times \sin \theta 4 \quad (5)$$

In Equation (5), angle θ3 is known from the relationship between the B scan position and the position of inspection roll 51, as illustrated in FIG. 7A. The refractive index n is also known. Therefore, angle θ4 can be obtained by Equation (5).

Therefore, by using the above-mentioned refractive index n and angle θ4, the Z-axis of the B scan image of SS-OCT measurement is multiplied by coefficient 8 shown below. Thereby, the thickness of multi-layer sheet 10 can be converted into the actual thickness T.

That is, with respect to the obtained optical path length D4, the actual thickness T of multi-layer sheet 10 can be obtained based on the following Equation (6). At this time, coefficient δ becomes a value obtained by the following Equation (7).

$$T = (D4/n) \times \cos \theta 4 \qquad (6)$$

$$\beta = 1/n \times \cos \theta 4 \qquad (7)$$

In the above, the amount of correction of the B scan image based on the height of the B scan position and the incident angle of the measurement light is calculated on the assumption that inspection roll 51 has a cylindrical shape, but the present disclosure is limited to this. It may be stored as a table in advance by using the actual measured values, for example, the pixel values of the front surface position and the back surface position of multi-layer sheet 10 at each B scan position in the depth direction, or the like. The amount of correction may be calculated based on the stored table. As a result, the same effect can be obtained even when the shape of inspection roll 51 is unknown.

Regarding the Calculation Method of Thickness Z

Figure 7B:
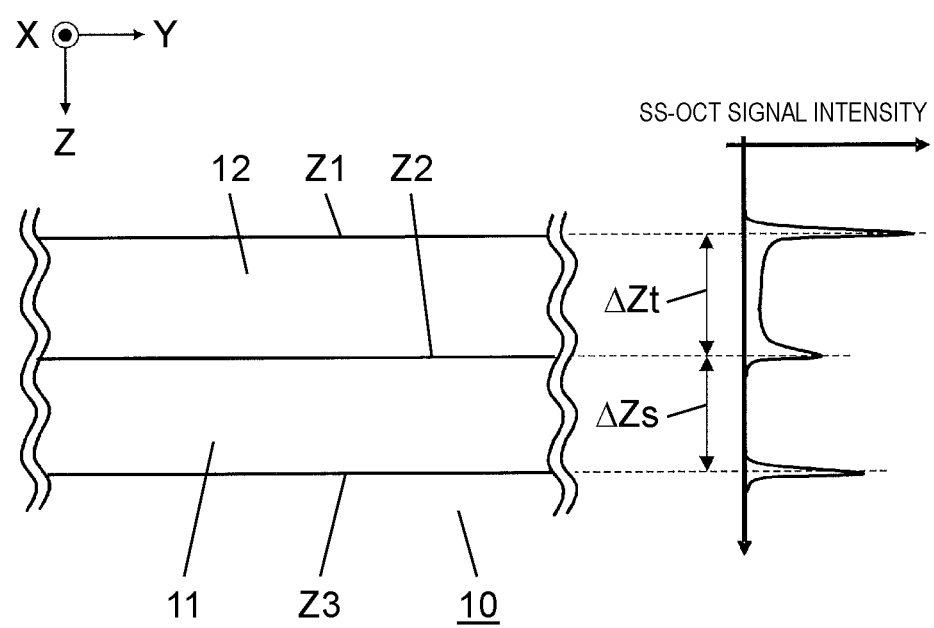
FIG. 7B is an explanatory view of a calculation method of the thickness of the multi-layer sheet according to Exemplary Embodiment 1 and Exemplary Embodiment 2.

Next, a calculation method of the thickness of the multi-layer sheet will be described with reference to FIG. 7B. FIG. 7B is an explanatory view of a calculation method of the thickness of multi-layer sheet 10.

Thickness calculator 62 of sheet generation controller 60 measures boundary position Z1, boundary position Z2, and boundary position Z3 illustrated in the left figure in FIG. 7B based on the obtained B scan image. Boundary position Z1 is a boundary position between the air and coating material 12. Boundary position Z2 is a boundary position between coating material 12 and sheet material 11. Boundary position Z3 is a boundary position between sheet material 11 and the back surface air or inspection roll 51.

Regarding the measurement of boundary positions Z1, Z2, and Z3, for example, the measurement may be performed by using the peak position of the signal intensity in the Z direction, or the measurement may be performed by using another signal processing method such as edge detection with respect to the SS-OCT signal. At this time, in the X direction and the Y direction, for example, a filter such as integration may be applied to improve the measurement accuracy of the boundary position.

In Exemplary Embodiment 1 and Exemplary Embodiment 2, since thickness ΔZs and thickness ΔZt may be calculated, boundary position Z1, boundary position Z2, and boundary position Z3 may be known. Therefore, for example, it is not necessary to distinguish whether the SS-OCT signal corresponding between boundary position Z2 and boundary position Z3 is the SS-OCT signal from sheet material 11 or coating material 12. However, both signals may be distinguished by using the fact that the intensity of the scattered light with respect to the measurement light is different inside sheet material 11 and coating material 12.

Specifically, when the inside of sheet material 11 is uniform and the inside of coating material 12 contains mixed objects, the scattering of the measurement light inside coating material 12 is large. In that case, as illustrated in the right figure in FIG. 7B, the signal intensity between boundary position Z1 and boundary position Z2 is stronger than the signal intensity between boundary position Z2 and boundary position Z3. Therefore, both sheet material 11 and coating material 12 may be distinguished by using the difference in the obtained signal intensities.

From the obtained boundary positions Z1, Z2, and Z3, (Z2−Z1) becomes the optical thickness including the refractive index of coating material 12. Further, (Z3−Z2) becomes the optical thickness including the refractive index of sheet material 11. Therefore, these optical thicknesses are divided by the known refractive indexes of sheet material 11 and coating material 12. As a result, the respective physical thickness ΔZs and physical thickness ΔZt are obtained. Physical thickness ΔZs and physical thickness ΔZt here are the average thicknesses in the X direction obtained by the two B scans. For example, the minimum or maximum thickness may be set for each part of the B scan in the X direction. As a result, not the average in the X direction, the minimum value or maximum value of the thicknesses in that range can be adopted as the "physical thickness".

Sheet generation controller 60 drives coating device 33 while rotationally driving winding roll 40, and continuously performs the above measurement while changing rotation angle θ of winding roll 40. Thereby, thickness ΔZs and thickness ΔZt are measured at all rotation angles θ until the completion of the production of multi-layer sheet 10.

From the above, thickness ΔZs and thickness ΔZt of multi-layer sheet 10 can be calculated.

Regarding the Quality Determination of the Multi-layer Sheet Next, the quality determination of generated multi-layer sheet 10 will be described.

First, when multi-layer sheet 10 is used as an adhesive sheet, the function as the multi-layer sheet may not be achieved unless thickness ΔZt and thickness ΔZs are equal to or larger than a certain size. Specifically, for example, when thickness ΔZs of sheet material 11 is thin, the intensity is insufficient. On the other hand, when thickness ΔZt of coating material 12 that is an adhesive is thin, the adhesive force may be insufficient.

Therefore, in Exemplary Embodiment 1 and Exemplary Embodiment 2, the quality determination of the multi-layer sheet is performed by using a first threshold value as a threshold value having a certain size. Specifically, the quality determination of the multi-layer sheet is performed by comparing the first threshold value with thickness ΔZs and thickness ΔZt by determiner 63. At this time, for example, the first threshold value is set to 50 μm.

On the other hand, when the values of thickness ΔZs and thickness ΔZt are too large, a problem may occur. Therefore, thickness ΔZs and thickness ΔZt need to be equal to or less than a certain size. The quality determination of the multi-layer sheet is further performed by using a second threshold value as a threshold value of a certain size. At this time, for example, the second threshold value is set to 100 μm.

That is, a value equal to or larger than the first threshold value and equal to or less than the second threshold value is stored in advance in storage 64 as an OK range of the multi-layer sheet. Based on the stored OK range, determiner 63 performs the quality determination of multi-layer sheet 10.

Actions and Effects of Exemplary Embodiment 1

According to Exemplary Embodiment 1, thickness ΔZs of sheet material 11 and thickness ΔZt of coating material 12 are measured by using SS-OCT device 50 in which the interference light is used. Therefore, it is not necessary to provide measurement head 52 constituting SS-OCT device 50 with a cover for preventing explosion such as X-ray thickness meter 93 in Patent Literature 1. That is, the installation place of measurement head 52 can be set near the position where coating material 12 is applied to sheet material 11. As a result, sheet producing device 1 can perform an inspection of the thickness of multi-layer sheet 10 immediately after producing multi-layer sheet 10 while producing multi-layer sheet 10. Therefore, the tact time from the start of the production of multi-layer sheet 10 to the end of the inspection of the thickness of multi-layer sheet 10 can be shortened.

Exemplary Embodiment 2

Hereinafter, a sheet producing device 1A according to Exemplary Embodiment 2 of the present disclosure will be described separately in terms of items.

Schematic Configuration of Sheet Producing Device

First, a schematic configuration of sheet producing device 1A according to Exemplary Embodiment 2 of the present disclosure will be described with reference to FIG. 8.

Figure 8:
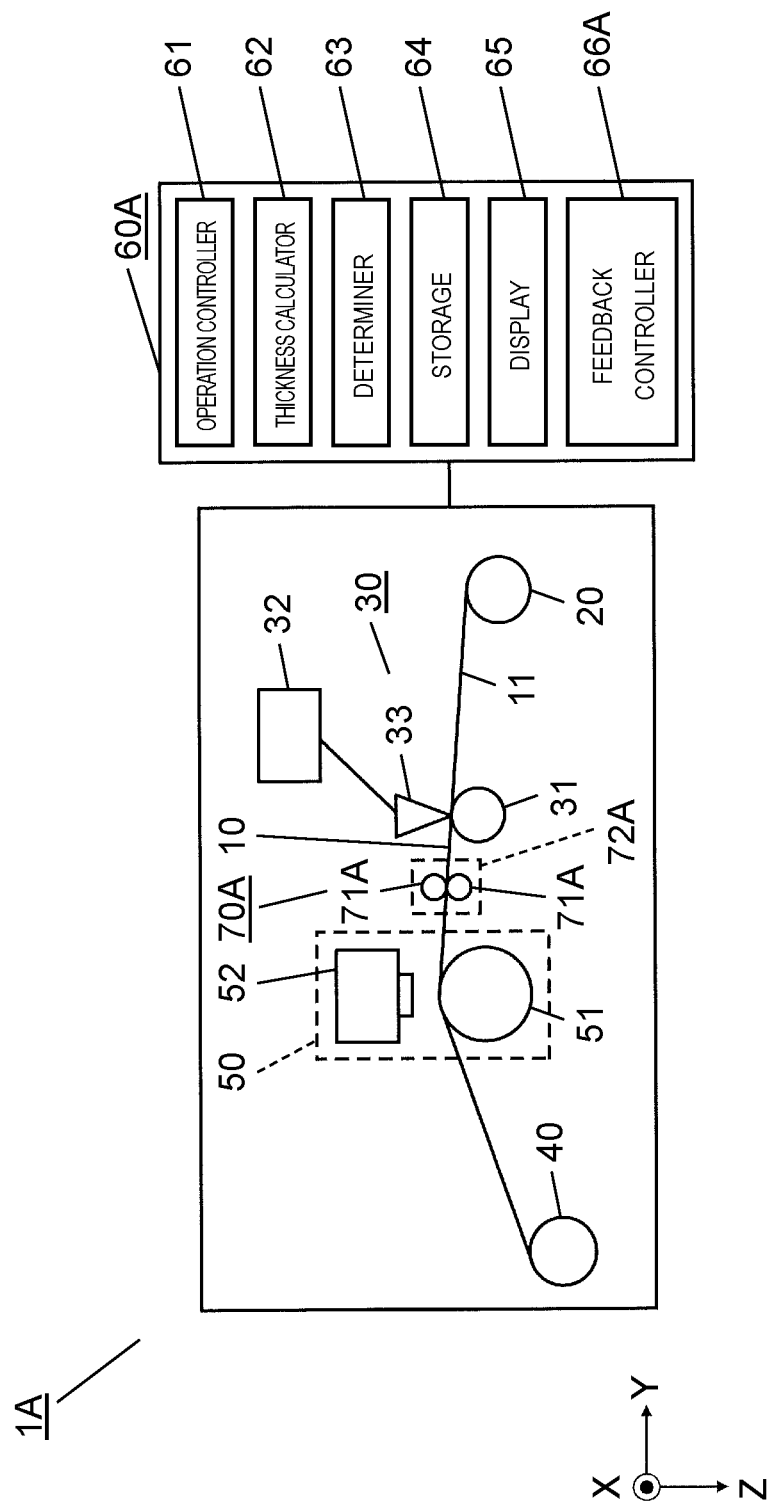
FIG. 8 is a schematic view illustrating a schematic configuration of a sheet producing device according to Exemplary Embodiment 2.

FIG. 8 is a schematic view of sheet producing device 1A according to Exemplary Embodiment 2 of the present disclosure. The same components as those in Exemplary Embodiment 1 may be given the same reference numerals and the same names, and the description thereof may be omitted.

As illustrated in FIG. 8, sheet producing device 1A of Exemplary Embodiment 2 is different from sheet producing device 1 of Exemplary Embodiment 1 in that thickness adjustor 70A is further included, and sheet generation controller 60A is provided instead of sheet generation controller 60.

Thickness adjustor 70A of sheet producing device 1A includes a pair of rollers 71A that interpose multi-layer sheet 10 and movement device 72A that controls the positions of the pair of rollers 71A to change the thickness of multi-layer sheet 10.

The pair of rollers 71A are provided so as to interpose multi-layer sheet 10 between coating roll 31 and winding roll 40. Movement device 72A is driven so as to change the gap between the pair of rollers 71A. As a result, the thickness of multi-layer sheet 10 is configured to be changed.

Sheet generation controller 60A is different from sheet generation controller 60 of Exemplary Embodiment 1 in that feedback controller 66A is further provided.

Specifically, feedback controller 66A feeds back the amount of control, which is based on thickness $\Delta Zs$ and thickness $\Delta Zt$ obtained by using SS-OCT device 50, to movement device 72A of thickness adjustor 70A. The relationship between thickness $\Delta Zs$ and thickness $\Delta Zt$, and the amount of control is stored in advance in storage 64 as a relational equation or a table. That is, feedback controller 66A determines the amount of control by using the relational equation or the table stored in advance, and feeds back the amount of control to movement device 72A.

Sheet Producing Method

Figure 9:
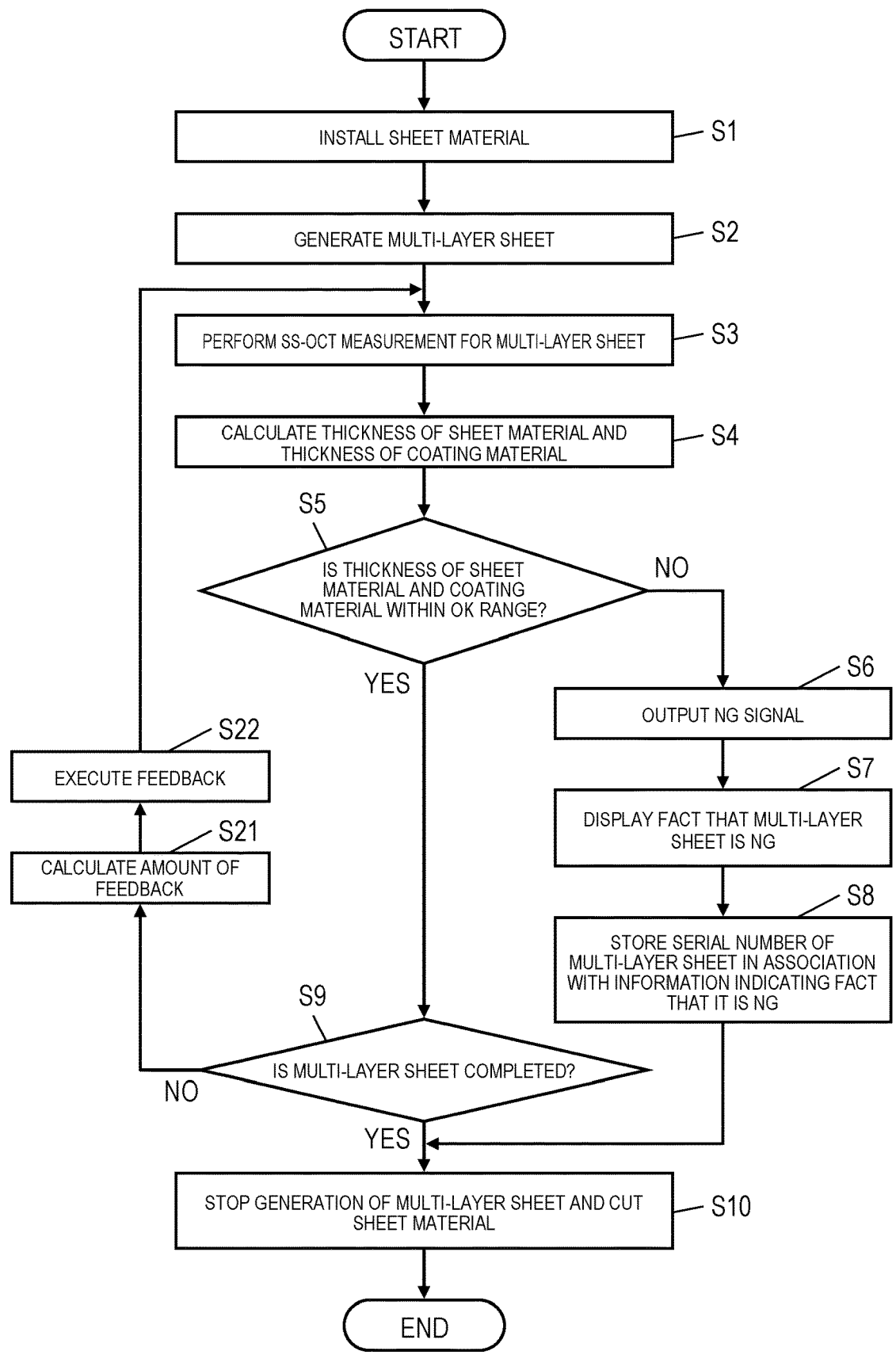
FIG. 9 is a flowchart illustrating a sheet producing method according to Exemplary Embodiment 2.
Figure 10:
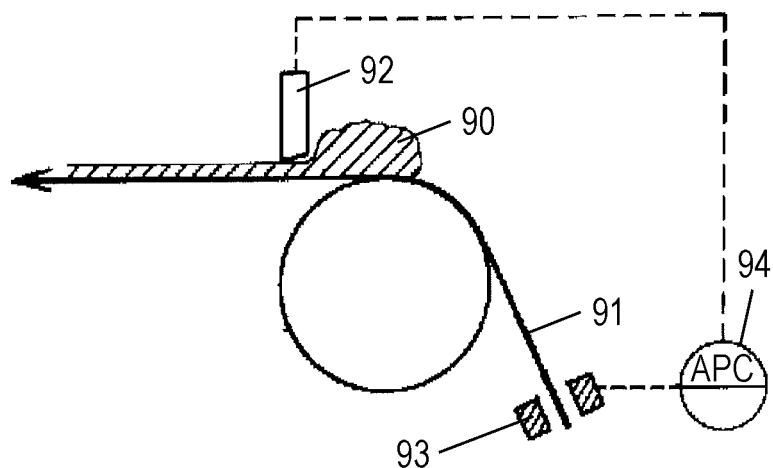
FIG. 10 is an explanatory view of the description in Patent Literature 1 in the related art.

Next, a sheet producing method by sheet producing device 1A will be described by using FIG. 9 with reference to FIG. 8. FIG. 9 is a flowchart illustrating a sheet producing method. The same steps as those in Exemplary Embodiment 1 may be designated by the same reference numerals and the description thereof may be omitted.

First, as illustrated in FIG. 9, the processes of steps S1 to S9 of Exemplary Embodiment 1 illustrated in FIG. 3 are performed.

In step 9, operation controller 61 determines whether or not multi-layer sheet 10 is completed. At this time, when operation controller 61 determines that multi-layer sheet 10 is completed (YES in step S9), the process in step S10 is performed.

On the other hand, when operation controller 61 determines that multi-layer sheet 10 is not completed (NO in step S9), feedback controller 66A calculates the amount of control (amount of feedback) of the pair of rollers 71A based on the calculation results of thickness $\Delta Zs$ and thickness $\Delta Zt$ in step S4 (step S21).

Feedback controller 66A causes movement device 72A to execute feedback (step S22).

Next, movement device 72A adjusts the gap between the pair of rollers 71A based on the amount of feedback.

Thereafter, the process returns to step S3, and the SS-OCT measurement by SS-OCT device 50 is performed again.

Next, as in Exemplary Embodiment 1, sheet material 11 from sheet supply reel 20 to coating roll 31 is cut by a cutting part (not illustrated) (step S10), and the sheet producing operation of multi-layer sheet 10 is ended.

Modification Example

Needless to say, the present disclosure is not limited to the exemplary embodiments described above, and various modifications can be made without departing from the spirit of the present disclosure.

For example, in Exemplary Embodiment 1 and Exemplary Embodiment 2, the following configurations may be applied.

Specifically, threshold values of an upper limit and a lower limit may be set for each of sheet material 11 and coating material 12 as criteria for determining the quality of multi-layer sheet 10. As a result, for example, when the thickness of sheet material 11 fluctuates as a material characteristic, by making the threshold value of coating material 12 stricter than the threshold value of the upper and lower limits of sheet material 11, the effect of maintaining the thickness accuracy of the coating material can be obtained.

In the above description, although it has been described in the example of obtaining the actual thickness $\Delta Zs$ and thickness $\Delta Zt$ by dividing the optical thickness by the refractive index, but the present disclosure is not limited to this. For example, the obtained optical thickness may be used as it is as the respective thickness $\Delta Zs$ and thickness $\Delta Zt$, and a threshold value corresponding to thickness $\Delta Zs$ and thickness $\Delta Zt$ may be set. As a result, the accuracy can be maintained even when the refractive index of object is unknown.

Thickness $\Delta Zs$ and thickness $\Delta Zt$ may be calculated based on the result of one B scan (one B scan image), and thickness $\Delta Zs$ and thickness $\Delta Zt$ may be calculated based on the result of at least one A scan. The measurement light may be incident on both surfaces of multi-layer sheet 10, in other words, sheet material 11 side and coating material 12 side, and thickness $\Delta Zs$ and thickness $\Delta Zt$ may be measured by using the measurement light. At this time, the above configuration can be implemented by using two SS-OCT devices 50. As a result, a good image can be obtained on the back surface side of sheet material 11 even when the transmittance is insufficient.

In the above description, the configuration in which sheet supply reel 20, coating roll 31, and inspection roll 51 are not individually provided with a drive source for rotating each of them has been described as an example, but a rotation drive device such as a motor may be provided individually. Thereby, as compared with a case driven by a single motor, it is easier to control the travel speed.

In Exemplary Embodiment 2, a configuration in which a mechanism for adjusting the gap between the pair of rollers 71A is adopted as thickness adjustor 70A has been described as an example, but the present disclosure is not limited to this. Another mechanism having a function of adjusting the thickness of multi-layer sheet 10 in the Z-axis direction, for example, a mechanism for adjusting the thickness of multi-layer sheet 10 by heating may be adopted. For example, a mechanism for adjusting the thickness of only coating material 12 by a peeling off action such as a scraper may be adopted. As a result, the effect of being able to adjust the thickness can be obtained regardless of the physical characteristics of the coating material.

In Exemplary Embodiment 2, thickness adjustor 70A has been described as an example of a configuration in which the thickness of multi-layer sheet 10 is changed by interposing multi-layer sheet 10, but the present disclosure is not limited to this. For example, a configuration in which the thickness of sheet material 11 is changed by interposing only sheet material 11, may be used. Further, a configuration in which only the thickness of a coating by coating device 33 is changed may be used. At this time, a configuration in which the thickness of both sheet material 11 and coating material 12 is changed at the same time may be used.

Any exemplary embodiment or modification example may be combined as appropriate among the above-described exemplary embodiments or modification example. As a result, the effects of each can be achieved.

In Exemplary Embodiment 1 and Exemplary Embodiment 2, when infrared light, which is the measurement light, passes through the resin, speckle is generated, and the accuracy of the detected thickness is lowered. Therefore, as described above, it is more desirable, but not limited to, to measure the thickness of sheet material 11 and coating material 12 on inspection roll 51 during the production of the multi-layer sheet. For example, after multi-layer sheet 10 is completed, it is possible to measure the thickness by using SS-OCT measurement. As a result, the measurement can be performed in a statically indeterminate environment as compared with inspection roll 51.

What is claimed is:

1. A sheet producing device for producing a multi-layer sheet by applying a coating material to a sheet material that is transported, the sheet producing device comprising:
a radiation light source that emits radiation light;
a division portion that divides the radiation light into measurement light to be incident on the multi-layer sheet and reference light with which a reference surface is to be irradiated;
an optical member that emits the measurement light onto the multi-layer sheet and receives the measurement light reflected by the multi-layer sheet;
an interference detector that detects interference light in which the measurement light reflected by the multi-layer sheet and the reference light reflected by the reference surface interfere with each other;
a thickness calculator that calculates a thickness of the sheet material and a thickness of the coating material of the multi-layer sheet based on the detected interference light;
a coating device for forming the multi-layer sheet by applying the coating material to the sheet material transported on a coating roll;
an inspection roll that is provided on an opposite side of the optical member with the multi-layer sheet interposed therebetween so as to contact with the multi-layer sheet;
a winding roll for winding the multi-layer sheet; and
a profile acquisition portion that acquires an intensity profile of the interference light, which is obtained by moving an incident position of the measurement light in a width direction of the multi-layer sheet, at a predetermined position in a length direction of the multi-layer sheet by controlling the optical member, wherein
the inspection roll is provided such that a central axis of the inspection roll is parallel to the width direction of the multi-layer sheet,
the optical member is configured to emit the measurement light toward an arc surface of the inspection roll, the arc surface being in contact with the multi-layer sheet,
the multi-layer sheet is positioned to be in contact with the inspection roll at a predetermined holding angle on the arc surface of the inspection roll,
the profile acquisition portion acquires the intensity profile of the interference light at a plurality of positions in the length direction of the multi-layer sheet,
the thickness calculator calculates the thickness of the sheet material and the thickness of the coating material based on a result of averaging a plurality of the intensity profiles,
the profile acquisition portion acquires an intensity profile of first interference light at a first position in the length direction of the multi-layer sheet and then acquires an intensity profile of second interference light at a second position behind the first position in a transporting direction of the multi-layer sheet, and
when a time at which the measurement light is emitted to the first position is defined as a first time point, and a time at which the measurement light is emitted to a second position is defined as a second time point, a distance between the first position and the second position is the same as a distance that the multi-layer sheet is transported during an elapsed time between the first time point and the second time point.

2. The sheet producing device of claim 1, wherein the optical member is configured such that the measurement light is incident on the arc surface perpendicularly.

3. The sheet producing device of claim 1, wherein the optical member is configured to emit the measurement light onto the multi-layer sheet positioned between the coating device and the winding roll.

4. The sheet producing device of claim 1, further comprising:
a thickness adjustor that adjusts at least one of the thickness of the sheet material and the thickness of the coating material based on the thickness of the sheet material and the thickness of the coating material.

5. The sheet producing device of claim 1, wherein the radiation light source emits infrared light as the radiation light.

6. The sheet producing device of claim 1, wherein the radiation light source emits the radiation light in which a wavelength changes periodically in a range of 1550 nm±100 nm.

7. The sheet producing device of claim 1, wherein the radiation light source emits the radiation light that contains light having a plurality of wavelengths within a range of 1550 nm±100 nm.

8. The sheet producing device of claim 1, further comprising:
a determiner that determines a quality of the multi-layer sheet based on the thickness of the sheet material and the thickness of the coating material, wherein
the determiner is configured to determine an OK range when the thicknesses of the sheet material and the coating material are 50 μm or more and 100 μm or less, respectively.

9. A sheet producing method for producing a multi-layer sheet by applying a coating material to a sheet material that is transported by using the sheet producing device of claim 1, the sheet producing method comprising:
- emitting the radiation light from the radiation light source;
- dividing the radiation light into the measurement light and the reference light;
- causing, with the multi-layer sheet being in contact with the arc surface of the inspection roll at the predetermined holding angle, the optical member to emit the measurement light onto the multi-layer sheet and making the measurement light reflected by the multi-layer sheet incident on the optical member;
- irradiating the reference surface with the reference light;
- detecting the interference light in which the measurement light reflected by the multi-layer sheet and the reference light reflected by the reference surface interfere with each other; and
- calculating the thickness of the sheet material and the thickness of the coating material of the multi-layer sheet based on the detected interference light.

* * * * *